United States Patent [19]

McFarland et al.

[11] Patent Number: 5,455,630
[45] Date of Patent: Oct. 3, 1995

[54] METHOD AND APPARATUS FOR INSERTING DIGITAL DATA IN A BLANKING INTERVAL OF AN RF MODULATED VIDEO SIGNAL

[75] Inventors: Alan McFarland, North Hollywood, Calif.; Stuart J. Lipoff, Newton, Mass.; Jung-Ming Wu; Richard H. Caro, both of Acton, Mass.

[73] Assignee: Arthur D. Little Enterprises, Inc., Cambridge, Mass.

[21] Appl. No.: 103,067

[22] Filed: Aug. 6, 1993

[51] Int. Cl.$^6$ .................................... H04N 7/087
[52] U.S. Cl. ........................... 348/476; 348/478; 358/323
[58] Field of Search .................... 358/323, 335; 348/465, 473, 474, 460, 724, 478, 479; H04N 7/087

[56] References Cited

U.S. PATENT DOCUMENTS

| | | | |
|---|---|---|---|
| 4,350,999 | 9/1982 | Mortimer | 348/479 |
| 4,438,451 | 3/1984 | Hinn et al. | 348/557 |
| 4,572,470 | 6/1987 | Morimoto et al. | 358/323 |
| 4,745,476 | 5/1988 | Hirashima | 348/478 X |
| 5,063,456 | 11/1991 | Horiuchi et al. | 348/478 X |

*Primary Examiner*—Victor R. Kostak
*Attorney, Agent, or Firm*—Blakely, Sokoloff, Taylor, Zafman

[57] ABSTRACT

A time code or other digital code is inserted into a video signal by modulating the video signal itself or the signal's radio frequency (RF) carrier. This allows the code to be recorded concurrently with recording of the video signal, thereby obviating the need for a specially adapted recording apparatus. Furthermore, since the code is embedded in the recorded video signal, the encoded information may be retrieved from the video signal in a unit that is external to the playback apparatus. In combination with a conventional video cassette recorder (VCR), the video signal that is tuned to by the VCR is processed to extract raster synchronization signals. A modulator inserted ahead of the RF input to the VCR modulates the RF carrier in response to the digital code. Feedback of the tuned video signal insures proper synchronization of the broadband RF modulation so that the digital code is inserted into a non-viewable portion of the recorded video signal.

21 Claims, 3 Drawing Sheets

FIG. 4
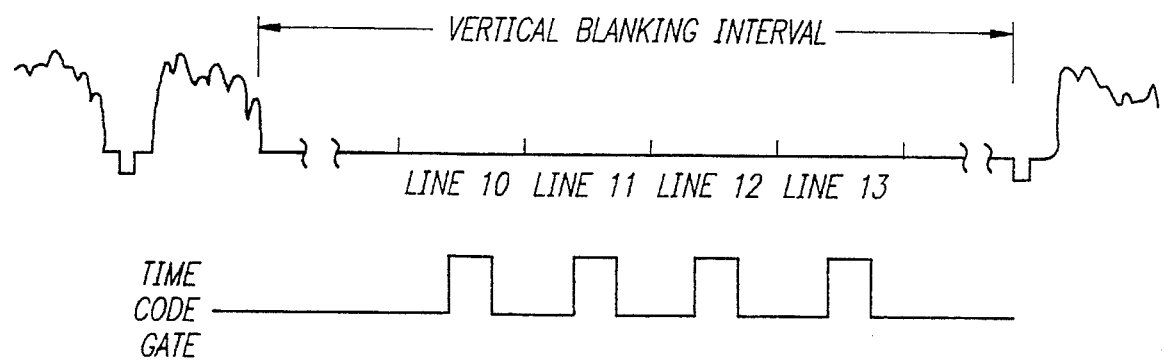
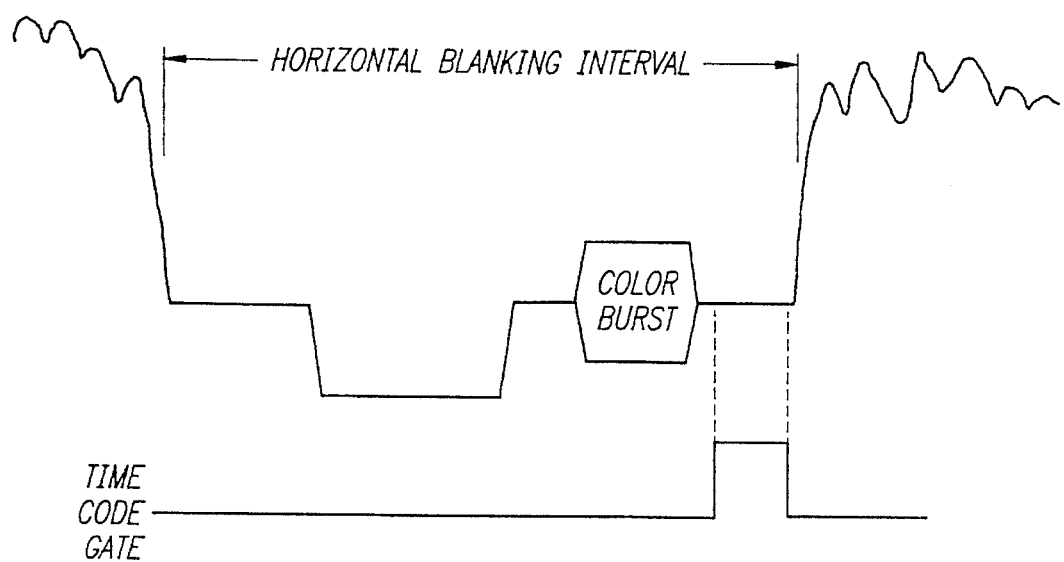
FIG. 5

METHOD AND APPARATUS FOR INSERTING DIGITAL DATA IN A BLANKING INTERVAL OF AN RF MODULATED VIDEO SIGNAL

BACKGROUND OF THE INVENTION

1. Field of the Invention

This invention relates to the field of video signal processing, and particularly to a system for encoding a video signal with digital information such as a time code, tape location information or recorded program identification.

2. Background Art

When recording a video signal, it is often desirable to encode the video signal with a time code or other digital information. A time code is particularly useful for providing an accurate reference for locating specific segments of the recorded signal. In this way, for example, a videotape may be edited by designating the starting and ending times of those portions of the video signal that are to be retained in the edited copy. Magnetic recorders for professional use will often dedicate a track on the recording medium for recording a time code, but no such track is provided in the popular VHS recording format used in nearly all home video recorders.

A dedicated time code track requires that the time code information, generally in the form of digital data, be magnetically recorded on the same medium as the audio and/or video signal. To utilize the time code, it would be necessary to provide dedicated record and playback heads for the time code track. Due to the added complexity of recording and decoding magnetically recorded time codes, such capability is unavailable in consumer products.

Another approach used in professional recording equipment is a vertical interval time code (VITC). Standards for VITC have been established by the Society of Motion Picture and Television Engineers (SMPTE). Time coding with VITC does not require a dedicated recording track, but instead encodes timing data onto one of the non-viewed horizontal lines within the vertical blanking interval of the standard video signal format prescribed by the National Television Standards Committee (NTSC).

There are a number of situations in which time code data or some other location and/or identification information would be valuable in the home recording environment. One particular situation involves the playback of previously recorded videotapes of broadcast programs. Such "time shifting" is the most common use of home market video cassette recorders (VCR's). Most home viewers prefer to view only the program portion of such videotapes and will frequently "fast forward" through the commercial and promotional interruptions. Ideally, a system could be provided to automatically "fast forward" through such interruptions during playback of the videotape. The assignee of this application is developing such a system. The system requires a timing reference for the video signal during playback of the videotape so that previously identified portions of the signal that contain commercial and promotional messages may be scanned past at a fast rate. Such timing information may be provided in a variety of ways; however, one of the most expedient ways is to have time code information recorded on the videotape itself.

Another example of a situation in which recorded time code information would be useful in the home market is in editing home videos. Just as in the professional field, editing of home videos may be facilitated with accurate time code information encoded directly on the tape.

Since home market VCRs do not provide the dedicated recording and playback heads nor the associated circuitry for time coding a recorded signal, there is a need for an alternative way of obtaining accurate timing information for a recorded video signal. Moreover, it would be highly desirable to provide such a capability without modifying conventional VCRs or videotapes.

SUMMARY OF THE INVENTION

The present invention provides a method and apparatus for inserting a time code or any other digital code into the video signal prior to being recorded on a VCR. The code is inserted by modulating the video signal itself or the signal's RF carrier. This allows the code to be recorded concurrently with recording of the video signal, thereby obviating the need for a specially adapted recording apparatus. Furthermore, since the code is embedded in the recorded video signal, the encoded information may be retrieved from the video signal in a unit that is external to the playback apparatus. Thus, this invention may be advantageously employed to insert and retrieve coded information with an unmodified conventional VCR.

In a preferred application of the invention, a time code is inserted into a video signal as it is recorded by a conventional VCR. The VCR receives as its input a broadband RF signal, such as provided by an antenna or cable system, comprising a spectrum of video signals. The desired video signal is recovered from the RF carrier by a tuner circuit internal to the VCR. The video signal that is being recorded is inaccessible outside of the VCR prior to being recorded without using a separate external tuner circuit tuned to the same channel as the VCR. Therefore, a time code cannot be inserted directly into the video signal. However, modulation of the RF carrier signal will affect the recorded video signal. Hence, by modulating the RF carrier signal with a digital code at the input to the VCR, the digital code will be preserved along with the recorded video signal. In one embodiment, coding modulation is performed with an attenuator that is enabled by the digital code inserted ahead of the RF input to the VCR. The attenuator reduces the amplitude of the RF carrier by 6–20 dB, thereby inserting a pulse in the recovered video signal. The video signal is encoded with a sequence of such pulses at periodic intervals to provide the time code.

A code inserted in this manner will appear as a random signal when the video signal is displayed on a television receiver unless the code pulses are synchronized with the display raster. The apparatus therefore processes the video signal which is available at the video output terminal of the VCR to detect the vertical and horizontal synchronization pulses. The code may thus be inserted at any desired location in the display raster, although it is preferred that the code be embedded in a portion of the recorded video signal that will not be visible to the viewer, such as the vertical blanking interval, and also in a portion of the signal that will not interfere with the vertical interval test and reference signals.

BRIEF DESCRIPTION OF THE DRAWINGS

FIG. 4 illustrates time code insertion in the vertical blanking interval of a video signal.

FIG. 5 illustrates time code insertion in the horizontal blanking interval of a video signal.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

Figure 1:
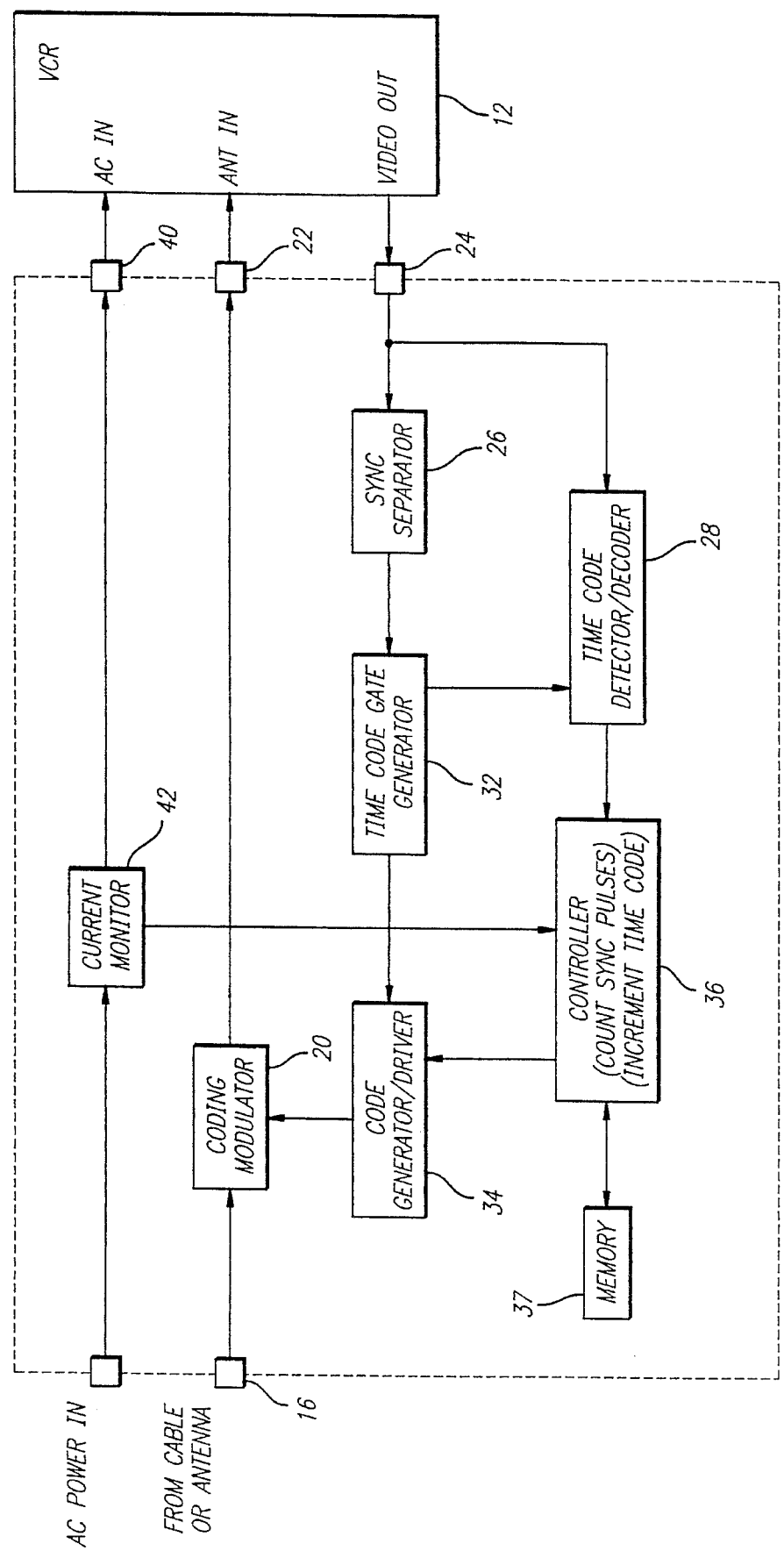
FIG. 1 is a functional block diagram of a coding apparatus according to the present invention.

FIG. 1 illustrates an exemplary application of the present invention in a videotape editing apparatus 10. The present invention is described in the specific context of a system for inserting a time code into a recorded video signal. However, it will be recognized that other information may be encoded in a like manner. For example, the information may comprise data extracted from the video signal itself, such as a program identification code and/or title. Additionally, the information may comprise data and/or instructions, i.e. computer program code, for the operation of apparatus 10. As yet another example, the encoded information may comprise data to be presented to the viewer on-screen during playback of the recorded video program.

Apparatus 10 is utilized in conjunction with an unmodified conventional video cassette recorder 12. Apparatus 10 receives an input television signal, which may be derived from a conventional television receiving antenna or television cable system, at input 16. In the illustrated embodiment, the television signal is received as a broadband RF signal. The received signal is asserted at coding modulator 20 where a digital code is modulated on the RF signal as will be subsequently described. Coding modulator 20 may include RF amplification to compensate for signal losses in apparatus 10. However, in most applications, particularly when the input television signal is provided by a cable system, the signal strength is sufficiently high so that amplification of the RF signal is not required. The output of coding modulator 20 is coupled to RF output connector 22 which is connected to the antenna input connector of VCR 12 in a conventional manner.

The video output port of VCR 12 is coupled to video input connector 24 of apparatus 10. If VCR 12 is in a videotape playback mode, the video signal appearing at connector 24 will be a previously recorded signal. In any other mode of operation of VCR 12, the video signal appearing at connector 24 will be the video signal demodulated from the RF input in accordance with the VCR's internal tuning circuitry. The video signal received at connector 24 is asserted at sync separator 26 and time code detector/decoder 28. Sync separator 26 can be a conventional integrated circuit, such as the LM1881 device manufactured by National Semiconductor, Inc., that extracts synchronizing signals from the video signal. In particular, circuit 26 provides a vertical sync pulse, a horizontal sync pulse, a color burst gate pulse and an odd/even field indicator.

Time code gate generator 32 receives the outputs of sync separator 26 and provides a gating pulse at the location within the video raster where the time code is to be inserted or read, as the case may be. The time code may be inserted in one or more of the horizontal lines of the vertical blanking interval in a manner similar to that implemented for VITC. Thus, for example, the time code may be inserted as successive bytes in horizontal lines 10–13 as illustrated in FIG. 4. It has been observed, however, that some television broadcasters insert special purpose signals during the vertical blanking interval that may cause interference with a time code inserted in the same part of the signal. In order to avoid such interference, the time code is preferably inserted during the "back porch" of the horizontal blanking interval immediately following the color burst as illustrated in FIG. 5. Each back porch may be encoded with one or more bits of the time code.

The time code preferably comprises a 24 bit data word, with each bit inserted into successive horizontal blanking intervals. The time code is thus inserted (although not visible on the television screen) in a vertical column spanning 24 lines of the television raster. The time code can thus be repeated as many as ten times within each field. Such redundancy of the time code is advantageous for reliable detection during the fast scan mode of the VCR. In this regard, it has been observed that the output video signal of most VCRs is corrupted in a pattern of horizontal bars when fast scanning. The spacing of the bars, however, is such that there will likely be some set of 24 contiguous lines within each field that are undistorted so that the time code can be properly detected at least once in each field.

The output of the time code gate generator 32 defines a precise time interval that is coincident with the back porch of the video signal that is being recorded by VCR 12. Although apparatus 10 is unaware of which of the many video signals carried within the broadband RF signal is being tuned to by VCR 12, feedback of the demodulated video signal insures proper synchronization of the coding modulation applied to the broadband RF signal. The recorded video signal will be observed to exhibit a signal level shift within the back porch interval whenever the attenuator is switched in.

When VCR 12 is in a recording mode, time codes are inserted into the video signal in the manner just described so that the encoded signal is recorded on the videotape. As mentioned, the data word preferably comprises a total of 24 bits; of these, 16 bits are allocated to the time code. The time code is incremented at regular frame intervals in the video signal and perhaps should therefore be more properly characterized as a frame counter since it does not indicate an absolute time. Nevertheless, the time code provides a useful measure of elapsed time since the beginning of a recording session. 16 bits are adequate to provide a resolution of six video frames (⅕ second) throughout a recording session having a duration of over 3½ hours.

The remaining eight bits of the data word are used to identify the particular recording session. This identification code remains constant as long as a video program is being recorded or until the time code reaches its maximum value. In the latter event, the recording session identification code is incremented and the time code is reset. Extended codes and other coding techniques may be employed within the scope of this invention. Moreover, parity or other check bits may be added to facilitate error detection and/or correction.

The particular bit values to be inserted into the video signal are generated by code generator/driver 34, which receives the data word from main controller 36. Controller 36, which is preferably implemented with a microprocessor, determines the appropriate recording session identification and also controls incrementing of the time code. As each horizontal sync is detected, the appropriate bit of the data word is selected by generator/driver 34 and is asserted at coding modulator 20 upon receipt of the time code gate signal.

Coding of the RF signal may be accomplished with any of a variety of techniques. For example, a DC pulse may be injected to represent either a binary "zero" or binary "one" (the logical polarity of the data encoding is not critical, but, of course, the choice of polarity must remain consistent). Such a pulse will cause the back porch to appear "blacker than black". As another example, the video signal may be actively modulated, such as with a brief 3.58 MHz frequency shift keying (FSK) or phase shift keying (PSK) coded signal, thereby taking advantage of the color burst normally present on the back porch.

Figure 2:
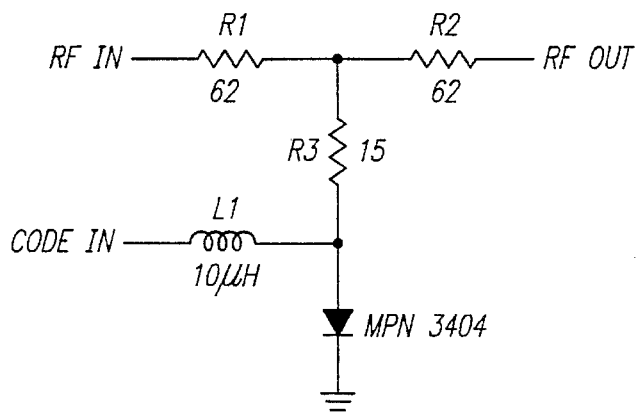
FIG. 2 is a circuit diagram of an RF attenuator suitable for use as the coding modulator in the apparatus of FIG. 1.

A particularly simple method of modulating the RF signal is by attenuation. In accordance with this method, coding modulator 20 may be conveniently implemented as shown in FIG. 2 with a –20 dB T-pad circuit using three resistors and a PIN diode switch. The digital code from generator/driver 34 is coupled to the anode of the diode across inductor L1.

When VCR 12 is in the play mode and is playing a previously encoded videotape, the time code is detected by time code detector/decoder 28 and is provided to controller 36 for use in performing editing functions.

It is desirable that apparatus 10 be able to determine the operating mode of VCR 12 so that the operating mode of apparatus 10 may be correspondingly controlled to insert and retrieve time codes without requiring operator commands. In the illustrated exemplary embodiment, AC line power for the VCR is supplied by apparatus 10 at receptacle 40. The magnitude of the AC current drawn by VCR 12 is monitored by current sensor 42 and reported to controller 36 as a digital input. Controller 36 determines the operating mode of VCR 12 based on the detection of vertical sync pulses by sync separator 26 and the magnitude of VCR current detected by sensor 42.

Figure 3:
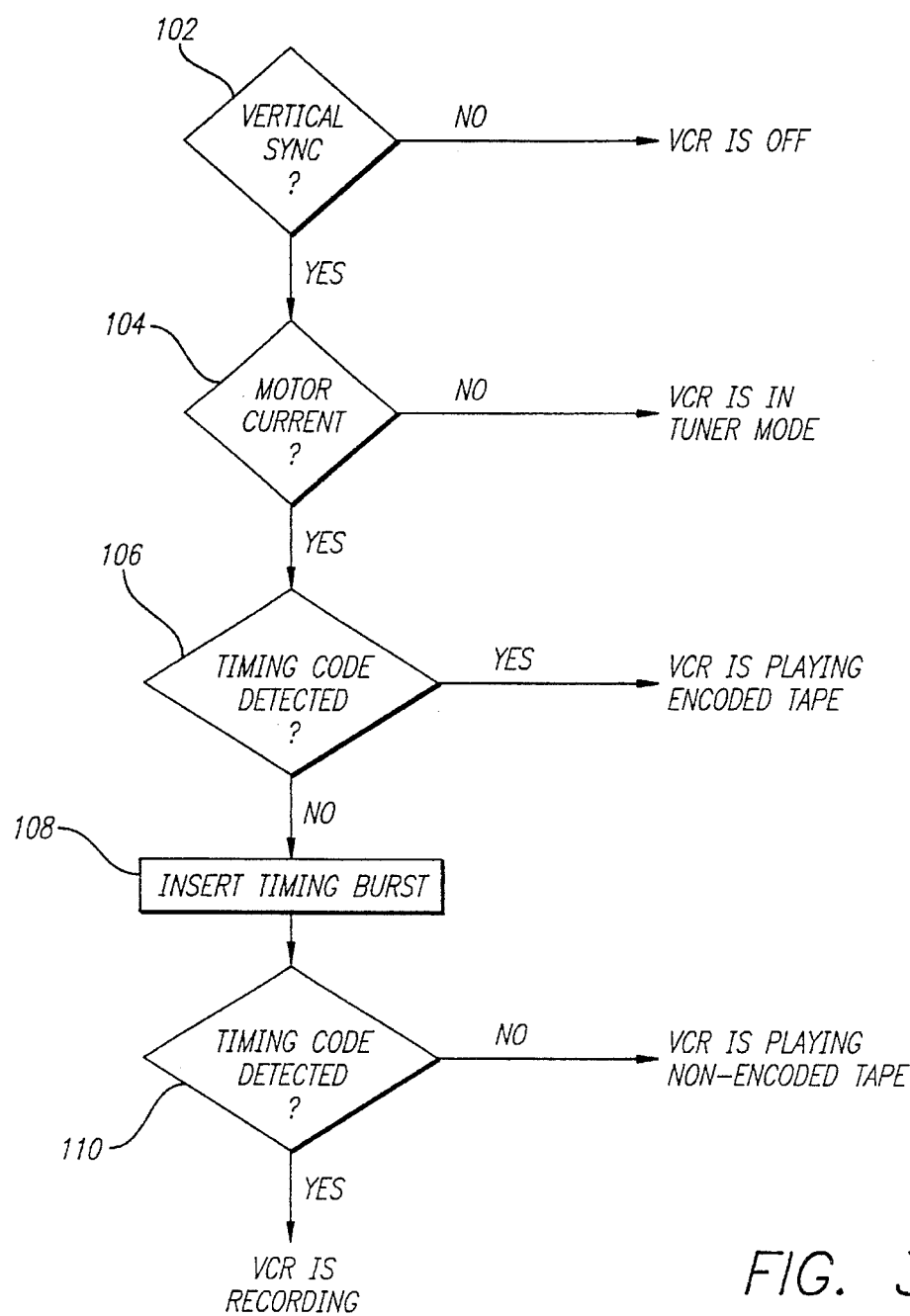
FIG. 3 is a functional flow diagram of a VCR mode detection routine.

FIG. 3 is a functional flow diagram of a VCR mode determination routine executed by controller 36. Beginning at step 102, the video signal received at input port 24 is monitored for the presence of vertical sync pulses. If no pulses are detected, there is no video signal present and the VCR is presumed to be OFF. If vertical sync pulses are detected, the VCR is ON and the magnitude of the VCR current is checked at step 104. During a set-up routine, the VCR is exercised in its various modes under the control of apparatus 10 and the levels of current drawn are monitored. While it may be possible to distinguish all of the VCR modes from one another based on the amount of current drawn, it is certainly easy to determine whether or not the VCR motors are on. The relative levels of current detected during set-up when the VCR motors are on and when they are off are stored in non-volatile memory 37.

If the current level monitored at step 104 indicates that the VCR motors are off, then the VCR is in a "tuner" mode; i.e., the VCR is ON, but is neither playing nor recording a videotape. However, if the VCR motors are on, then the video signal is examined for the presence of time code data at step 106. If such data is present, the video signal must be originating from playback of a previously encoded videotape, in which case controller 36 performs the appropriate editing functions. On the other hand, if time code data is not present in the video signal, the VCR may either be in the RECORD mode or may be playing a videotape that was not encoded with timing data.

At step 108, a burst of time code data is inserted into the RF signal by attenuator 20 as described above. The video signal received at input port 24 is again monitored at step 110. If the time code data is still not detected, then the video signal is not being demodulated from the RF signal and must therefore be originating from a non-encoded videotape. In this case, no editing actions are taken by controller 26. If the time code data inserted at step 108 is observed, the VCR must be in the RECORD mode and controller 26 then proceeds to generate time codes for insertion in the video signal and to perform the signal processing tasks necessary for later editing of the recorded video program when it is played back.

It will be recognized that the above described invention may be embodied in other specific forms without departing from the spirit or essential characteristics of the disclosure. Thus it is understood that the invention is not to be limited by the foregoing illustrative details.

We claim:

1. An apparatus for encoding a video signal with digital information, said video signal being carried as a first modulation of a radio frequency (RF) carrier signal, said apparatus comprising:

modulator means for applying a second modulation to the RF carrier signal in response to a digital code representative of the digital information, said modulator means having an RF input terminal for receiving the RF carrier signal containing the video signal, a control input terminal for receiving the digital code, and an RF output terminal to supply the RF carrier signal having said second modulation applied thereto;

tuner means for recovering the video signal from the RF carrier signal, said tuner means having an RF input terminal coupled to the RF output terminal of the modulator means and a video output terminal for supplying the video signal;

sync separator means for detecting a raster synchronization signal in the video signal and generating a code gate signal in response thereto, said sync separator means having a video input terminal coupled to the video output terminal of the tuner means and an output terminal for supplying the code gate signal;

code generator means for generating the digital code upon receipt of the code gate signal, said code generator means having an input terminal coupled to the output terminal of the sync separator means and an output terminal coupled to the control input terminal of the modulator means;

whereby the RF carrier signal is modulated in response to the digital code in synchronism with the detected raster synchronization signal.

2. The apparatus of claim 1 wherein the video signal includes a vertical blanking interval and the code gate signal is coincident with a portion of the vertical blanking interval.

3. The apparatus of claim 1 wherein the video signal includes a horizontal blanking interval and the code gate signal is coincident with a portion of the horizontal blanking interval.

4. The apparatus of claim 1 wherein the video signal includes a horizontal blanking interval having a back porch and the code gate signal is coincident with the back porch.

5. The apparatus of claim 1 wherein the digital code comprises a time code.

6. The apparatus of claim 5 further comprising means for counting successive raster synchronization signals and for incrementing the time code as a function of said count.

7. The apparatus of claim 1 wherein the tuner means is contained in a video cassette recorder.

8. In a video system including a tuner circuit for recovering a video signal carried as a first modulation of a radio frequency (RF) carrier signal, an apparatus for encoding the video signal with digital information comprising:

modulator means for applying a second modulation to the RF carrier signal in response to a digital code representative of the digital information, said modulator means having an RF input terminal for receiving the RF carrier signal containing the video signal, a control input terminal for receiving the digital code, and an RF output terminal coupled to the tuner circuit to supply the RF carrier signal having said second modulation applied thereto;

sync separator means for detecting a raster synchronization signal in the video signal and generating a code gate signal in response thereto, said sync separator means having a video input terminal coupled to the tuner circuit for receiving the video signal therefrom and an output terminal for supplying the code gate signal;

code generator means for generating the digital code upon receipt of the code gate signal, said code generator means having an input terminal coupled to the output terminal of the sync separator means and an output terminal coupled to the control input terminal of the modulator means;

whereby the RF carrier signal is modulated in response to the digital code in synchronism with the detected raster synchronization signal.

9. The apparatus of claim 8 wherein the video signal includes a vertical blanking interval and the code gate signal is coincident with a portion of the vertical blanking interval.

10. The apparatus of claim 8 wherein the video signal includes a horizontal blanking interval and the code gate signal is coincident with a portion of the horizontal blanking interval.

11. The apparatus of claim 8 wherein the video signal includes a horizontal blanking interval having a back porch and the code gate signal is coincident with the back porch.

12. The apparatus of claim 8 wherein the digital code comprises a time code.

13. The apparatus of claim 12 further comprising means for counting successive raster synchronization signals and for incrementing the time code as a function of said count.

14. The apparatus of claim 8 wherein the tuner circuit is contained in a video cassette recorder.

15. An apparatus for encoding a video signal with digital information, said video signal being recorded on a video cassette recorder having an input terminal for receiving the video signal to be recorded, said apparatus comprising:

modulator means for modulating the video signal in response to a digital code representative of the digital information, said modulator means having an input terminal for receiving the video signal prior to being recorded, a control input terminal for receiving the digital code, and an output terminal coupled to the input terminal of the video cassette recorder to supply the modulated video signal;

sync separator means for detecting a raster synchronization signal in the video signal and generating a code gate signal in response thereto, said sync separator means having a video input terminal for receiving the video signal and an output terminal for supplying the code gate signal;

code generator means for generating the digital code upon receipt of the code gate signal; said code generator means having an input terminal coupled to the output terminal of the sync separator means and an output terminal coupled to the control input terminal of the modulator means;

whereby the video signal is modulated in response to the digital code in synchronism with the detected raster synchronization signal.

16. The apparatus of claim 15 wherein the video signal includes a vertical blanking interval and the code gate signal is coincident with a portion of the vertical blanking interval.

17. The apparatus of claim 15 wherein the video signal includes a horizontal blanking interval and the code gate signal is coincident with a portion of the horizontal blanking interval.

18. The apparatus of claim 15 wherein the video signal includes a horizontal blanking interval having a back porch and the code gate signal is coincident with the back porch.

19. The apparatus of claim 15 wherein the digital code comprises a time code.

20. The apparatus of claim 19 further comprising means for counting successive raster synchronization signals and for incrementing the time code as a function of said count.

21. A method of encoding a video signal with digital information comprising the steps of:

(a) detecting a back porch of a horizontal blanking interval i the video signal;

(b) generating a digital code representative of the digital information; and (c) modulating the video signal with the digital code during a time coincident with the back porch, wherein the back porch of successive horizontal blanking intervals is modulated with a respective successive bit of the digital information.

* * * * *